(12) United States Patent
Sinha et al.

(10) Patent No.: US 11,788,493 B2
(45) Date of Patent: *Oct. 17, 2023

(54) MIXED-COMPRESSION INLET DUCT FOR TURBINE ENGINES FACILITATING SUPERSONIC FLIGHT

(71) Applicant: Combustion Research and Flow Technology, Inc., Pipersville, PA (US)

(72) Inventors: Neeraj Sinha, Ivyland, PA (US); Stephen M. Barr, Hellertown, PA (US); Michael R. O'Gara, Sellersville, PA (US)

(73) Assignee: Combustion Research and Flow Technology, Inc., Pipersville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,157

(22) Filed: Jul. 8, 2022

(65) Prior Publication Data

US 2023/0091268 A1    Mar. 23, 2023

Related U.S. Application Data

(63) Continuation of application No. 16/762,972, filed as application No. PCT/US2018/064665 on Dec. 10, 2018, now Pat. No. 11,466,644.

(Continued)

(51) Int. Cl.
*F02K 7/10* (2006.01)
*B64D 33/02* (2006.01)
*F02C 7/04* (2006.01)

(52) U.S. Cl.
CPC ............... *F02K 7/10* (2013.01); *B64D 33/02* (2013.01); *B64D 2033/026* (2013.01); *F02C 7/04* (2013.01)

(58) Field of Classification Search
CPC ..................................... F02K 7/10; F02C 7/04
See application file for complete search history.

(56) References Cited

U.S. PATENT DOCUMENTS 2,959,916 A * 11/1960 Carlton .................... F02C 7/04
138/40
2,995,892 A * 8/1961 Kosson .................. F02C 7/042
137/15.2

(Continued)

OTHER PUBLICATIONS

Barr, S., O'Gara, M., and Sinha, N., "Highly Compact Supersonic Inlet Design Optimization", AIAA-2018-4828, AIAA Propulsion and Energy Forum, 2018 Joint Propulsion Conference, Cincinnati, Ohio, Jul. 9-11, 2018, pp. 1-11. (Year: 2018).*

*Primary Examiner* — Lorne E Meade
(74) *Attorney, Agent, or Firm* — Michael Crilly, Esquire (57) ABSTRACT

An inlet duct for use with an engine is presented. The invention includes a duct structure, at least one spike disposed along an interior surface of the duct structure, and an inlet throat formed by one or more apexes disposed along an equal number of spikes. The inlet throat corresponds to the minimum cross-sectional area through which airflow passes as otherwise allowed by the maximal obstruction formed by the apex(es) within the duct structure. Each spike is bounded by a longitudinal ridge and a lateral ridge along an upper end and a base along a lower end. The longitudinal ridge and the lateral ridge intersect at the apex. In preferred embodiments, the longitudinal ridge is at least partially non-linear so as to properly conform to the interior surface of the duct structure. The portion of each spike upstream of the inlet throat functions primarily as a supersonic diffuser. The portion of each spike downstream of the inlet throat functions primarily as a subsonic diffuser. Airflow is isentropically compressed and then expanded within the inlet duct so that (Continued)

greater-than-subsonic flow at an input end is reduced to subsonic flow at an output end.

20 Claims, 6 Drawing Sheets

Related U.S. Application Data

(60) Provisional application No. 62/764,891, filed on Aug. 16, 2018.

(56) References Cited

U.S. PATENT DOCUMENTS

| | | | | |
|---|---|---|---|---|
| 3,041,827 A | * | 7/1962 | Ferri | F04D 21/00 |
| | | | | 138/40 |
| 9,884,688 B2 | * | 2/2018 | Rybalko | B64D 27/00 |
| 11,466,644 B2 | * | 10/2022 | Sinha | B64D 33/02 |

* cited by examiner

Straight line indicates planar surface.
Dashed line indicates non-planar surface.

Straight line indicates linear profile.
Dashed line indicates non-linear profile.

MIXED-COMPRESSION INLET DUCT FOR TURBINE ENGINES FACILITATING SUPERSONIC FLIGHT

CROSS REFERENCE TO RELATED APPLICATIONS

This application is a continuation of U.S. application Ser. No. 16/762,972 filed May 11, 2020 which is a National Phase of PCT Application No. PCT/US2018/064665 filed Dec. 10, 2018 which claims priority to U.S. Provisional Patent Application No. 62/764,891 filed Aug. 16, 2018, all entitled Mixed-Compression Inlet Duct for Turbine Engines Facilitating Supersonic Flight whereby all applications are incorporated in their entirety herein by reference thereto.

GOVERNMENT SPONSORED RESEARCH AND DEVELOPMENT

One or more of the inventions disclosed herein were supported, at least in part, by a grant from the Aircraft Division of the Naval Air Warfare Center in Patuxent River, Md. under Prime Contract No. N68335-14-C-0031-P00006. The United States Government may have certain limited rights to at least one form of the invention(s).

BACKGROUND OF THE INVENTION

1. Field of the Invention

The invention generally relates to an inlet and more particularly is concerned, for example, with an air inlet duct for use in combination with an engine which produces thrust via combustion or detonation of a fuel-air mixture. Specifically, the invention is an inlet duct which captures supersonic airflow passing over a flight vehicle and thereafter conditions the airflow before directing it into a gas turbine engine as subsonic airflow. The invention conditions the supersonic airflow via isentropic compression while minimizing shocks, vortices, and flow separation which could adversely affect engine performance.

2. Background

The performance capabilities of next generation flight vehicles, and cruise missiles in particular, are focused on higher flight velocities and longer flight ranges. These and other improvements are particularly challenging because next generation designs must operate within the constraints imposed by systems and equipment currently employed to handle, store and use such vehicles. For example, the infrastructure supporting a vehicle and improvements thereto may limit dimensional changes otherwise required to accommodate enhanced performance components. This means that enhancements to an air inlet duct facilitating an improved performance engine must fit within the stored and deployed volumes allocated to the inlet duct of current missile bodies.

Figure 1:
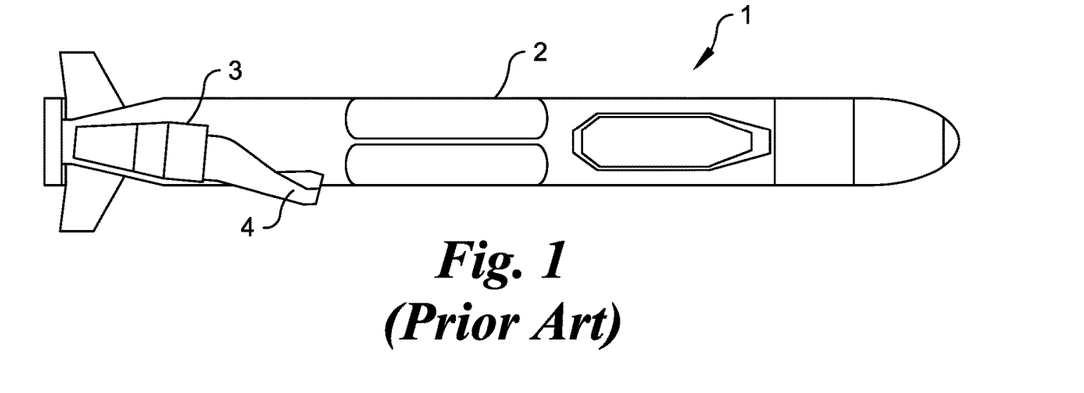
FIG. 1 is a cross-section view illustrating an exemplary flight vehicle in the form of a cruise missile.

A flight vehicle 1 is shown by way of example to a cruise missile in FIG. 1. The flight vehicle 1 generally includes an airframe 2 comprising, by way of example, structural components, outer coverings, wings, electronics, and other components. A turbine engine 3 is coupled to the airframe 2 at a location which optimizes overall performance. An inlet duct 4 is positioned adjacent to the turbine engine 3. In some applications, the inlet duct 4 could be initially stored within the flight vehicle 1 and then deployed after launch so as to extend therefrom. In yet other applications, the inlet duct 4 could include straight and/or curved sections which facilitate integration within the flight vehicle 1 and proper deployment and function thereof. Regardless, the inlet duct 4 is configured so as to capture supersonic airflow in the freestream adjacent to the flight vehicle 1 and to reduce the velocity of the supersonic flow to subsonic flow before communication into a turbine engine 3. As such, the inlet duct 4 must facilitate the velocity transition experienced by the airflow from supersonic to subsonic while maintaining other properties, such as mass flow rate and pressure, critical to proper use by and combustion or detonation within the turbine engine 3.

Inlet ducts 4 compatible with supersonic airflow are generally classified as internal-compression ducts, external-compression ducts, or mixed-compression ducts. Each classification corresponds to functional aspects of the supersonic portion of the inlet duct 4, namely, the portion of the inlet duct 4 upstream of a normal shock.

Figure 2A:
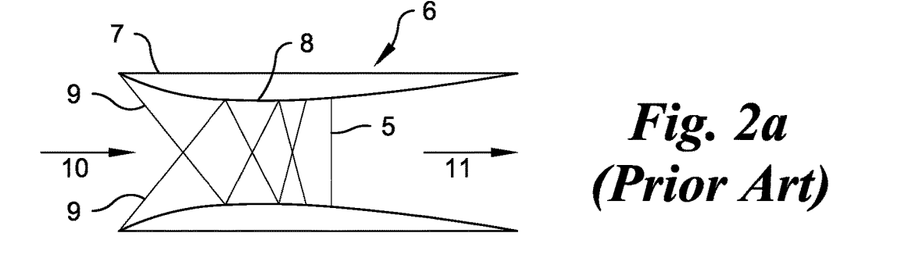
FIG. 2a is a cross-section view illustrating an exemplary internal-compression duct from the prior art.

Referring now to FIG. 2a, an internal-compression duct 6 compresses supersonic flow 10 captured by an inlet cowl 7 via oblique internal shocks 9 therein. The end result is a terminal or normal shock 5 and subsonic flow 11 downstream of an inlet throat 8. A disadvantage of this approach is non-compactness as the length of an internal-compression duct 6 required to properly transition from supersonic flow 10 to subsonic flow 11 is typically longer than other approaches.

Figure 2B:
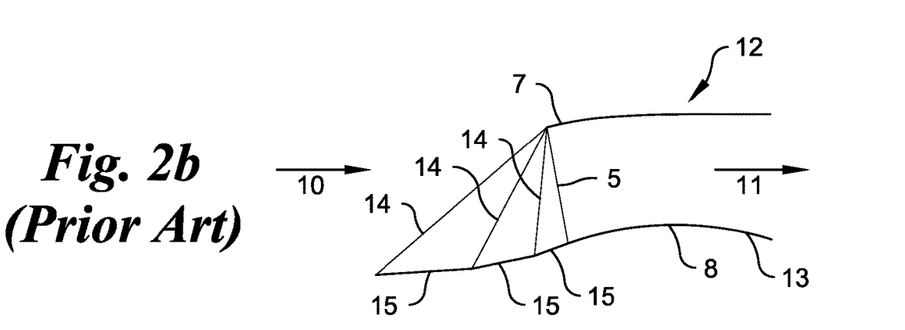
FIG. 2b is a cross-section view illustrating an exemplary external-compression duct from the prior art.

Referring now to FIG. 2b, an external-compression duct 12 utilizes shock ramps 15, typically comprised of planar-shaped surfaces disposed along the entrance side of the duct 12 perpendicular to the airflow. The shock ramps 15 facilitate oblique external shocks 14 which successively turn, decelerate, and compress the supersonic flow 10. A normal shock 5 is formed at the leading edge of the inlet cowl 7 and upstream of the inlet throat 8 so that the flow is subsonic within the duct 12 to the input end of the turbine engine 3. The subsonic flow 11 is diffused between the inlet cowl 7 and an aerodynamic interface plane 13 after the inlet throat 8. Although external-compression ducts 12 facilitate flow conditioning over a shorter length than internal-compression ducts 6, the tradeoff is often at the expense of efficiency.

Figure 2C:
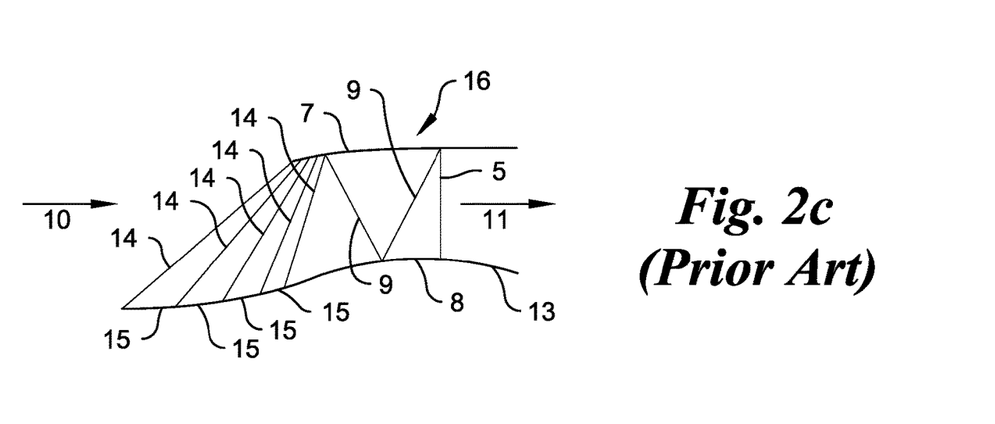
FIG. 2c is a cross-section view illustrating an exemplary mixed-compression duct from the prior art.

Referring now to FIG. 2c, a mixed-compression duct 16 utilizes movable shock ramps 15 to form oblique external shocks 14; however, flow between the inlet cowl 7 and an aerodynamic interface plane 13 also permits for the formation of internal shocks 9. In this approach, the combination of external shocks 14 and internal shocks 9 turns, decelerates, and compresses the supersonic flow 10 resulting in a normal shock 5 downstream of the inlet throat 8. Although mixed-compression ducts 16 are potentially more efficient than external-compression ducts 12 and shorter than internal-compression ducts 6, mixed-compression ducts 16 are susceptible to a host of other problems such as inlet unstart characterized by violent breakdown of the supersonic airflow and inlet buzz characterized by self-sustaining shock oscillations. Also, complex bleed arrangements are required to facilitate proper conditioning of the airflow. Therefore, further improvements to mixed-compression ducts 16 are necessary before this approach is more widely accepted as a viable design option for many flight vehicles.

As is readily apparent from the discussions above, the related arts do not provide an inlet duct compatible for use with gas turbine engines within next generation flight vehicles. In particular, the related arts do not describe a ramp-less inlet duct for use with a gas turbine permitting extended-range, supersonic flight by a vehicle, such as a cruise missile, whereby the inlet duct is compatible with volume and functional constraints imposed by way of considerations specific to performance, handling, storage, and use of the flight vehicle.

Accordingly, what is required is a mixed-compression, inlet duct compatible for use with a gas turbine permitting extended-range, supersonic flight whereby the inlet duct is compatible with volume and functional constraints imposed by way of considerations pertinent to aspects relevant to a flight vehicle.

SUMMARY OF THE INVENTION

An object of the invention is to provide a mixed-compression, inlet duct compatible for use with a gas turbine permitting extended-range, supersonic flight whereby the inlet duct is compatible with volume and functional constraints imposed by way of considerations pertinent to aspects relevant to a flight vehicle.

In accordance with embodiments of the invention, an inlet duct for use with an engine requiring an airflow which is subsonic includes a duct structure, at least one spike, and an inlet throat. The duct structure further includes an interior surface. Each spike is disposed along the interior surface and elongated between an upstream side and a downstream side. Each spike is defined by at least four surfaces which cooperate to form a longitudinal ridge which passes through an apex disposed between an upstream end and a downstream end and which also cooperate to form a lateral ridge which passes through the apex disposed between a pair of lateral ends. Upstream, downstream, and lateral ends are separately disposed about a base. A height along the longitudinal ridge is defined by the distance between the longitudinal ridge and the base. The height is maximal at the apex. A width is perpendicular to the height and corresponds to the distance across the base. The width is maximal at the apex. The inlet throat is formed by the apex of one or more spikes. The inlet throat maximally compresses the airflow after entering the duct structure greater than subsonic so that the airflow is subsonic downstream from the inlet throat.

In accordance with other embodiments of the invention, at least one surface is planar.

In accordance with other embodiments of the invention, at least one surface is non-planar.

In accordance with other embodiments of the invention, the longitudinal ridge is non-linear at least in part.

In accordance with other embodiments of the invention, the height and the width are both 0 at each of the upstream end and the downstream end.

In accordance with other embodiments of the invention, the upstream end, the downstream end, and the longitudinal ridge are rounded.

In accordance with other embodiments of the invention, the lateral ends and the lateral ridge are rounded.

In accordance with other embodiments of the invention, the inlet throat is decreased by increasing the height or the width of one or more apexes.

In accordance with other embodiments of the invention, the airflow is supersonic after passing through the inlet throat and then subsonic when entering the engine.

In accordance with other embodiments of the invention, the inlet throat forms a normal shock adjacent thereto where after the airflow is reduced to subsonic.

In accordance with method embodiments of the invention, a method for decelerating an airflow through a mixed-compression inlet duct includes the steps of passing an airflow greater than subsonic over at least one spike disposed along an interior surface of a duct structure, compressing the airflow along a first diffuser section of each spike upstream of an inlet throat during the passing step wherein the inlet throat is formed by the apex of one or more spikes, forming a normal shock after the compressing step via interaction between the airflow and the apex(es) at the inlet throat so that the airflow decelerates, expanding the airflow along a second diffuser section of each spike downstream of the inlet throat, and communicating the airflow into an engine at the downstream side of the duct structure. In the passing step, each spike is elongated between an upstream side and a downstream side. Each spike is defined by at least four surfaces which cooperate to form a longitudinal ridge which passes through an apex between an upstream end and a downstream end and which also cooperates to form a lateral ridge which passes through the apex between a pair of lateral ends. Upstream, downstream, and lateral ends are separately disposed about a base. A height along the longitudinal ridge is defined between the longitudinal ridge and the base. The height is greatest at the apex. A width is perpendicular to the height and corresponds to the distance across the base. The width is greatest at the apex. The height or the width increases along the first diffuser section in the direction of the inlet throat. The height or the width decreases along the second diffuser section in the direction away from the inlet throat.

In accordance with other method embodiments of the invention, the compressing step decelerates the airflow more rapidly when either the height or the width is increased along the first diffuser section.

In accordance with other method embodiments of the invention, the airflow exits the inlet throat with a Mach Number from 1.0 to 1.1.

In accordance with other method embodiments of the invention, the longitudinal ridge is non-linear at least in part so that the spike is curved at least partially along the interior surface.

In accordance with other method embodiments of the invention, at least one surface is non-planar.

In accordance with method embodiments of the invention, a method for constructing an inlet duct for use with an engine facilitating greater-than-subsonic flight includes the steps of defining a generalized form of a spike including a longitudinal ridge and a lateral ridge which intersect at an apex, mapping the generalized form onto an interior surface of the inlet duct so that the height profile and an apex angle are maintained, and adjusting the base or the interior surface so that the spike and the interior surface contact. In the defining step, the longitudinal ridge intersects a base at an upstream end and a downstream end to define a height profile therebetween wherein a height between the longitudinal ridge and the base increases in the direction toward the apex. The lateral ridge intersects the base at a pair of lateral ends to define a width therebetween wherein the width decreases with distance from the apex along the longitudinal ridge to define a width profile. The apex angle is defined by the lateral ridge passing between the lateral ends and through the apex.

In accordance with other method embodiments of the invention, the spike after the mapping step differs shape-wise from the generalized form because of shape features of the interior surface.

In accordance with other method embodiments of the invention, the mapping step maintains linearity of the longitudinal ridge in at least one plane.

In accordance with other method embodiments of the invention, the mapping step causes the spike to be curved.

In accordance with other method embodiments of the invention, the height is 0 and the width is 0 at each of the upstream end and the downstream end.

In accordance with other method embodiments of the invention, the height and the width are maximal at the apex.

In accordance with other method embodiments of the invention, the generalized form in the defining step is reconstructed from another spike and then modified to define the generalized form utilized in the mapping step.

In accordance with other method embodiments of the invention, the base is bounded by at least four surfaces and at least one surface is shortened or lengthened so as to allow contact with the interior surface in the adjusting step.

In accordance with other method embodiments of the invention, the base is bounded by at least four surfaces and the interior surface is moved so as to allow contact with least one surface in the adjusting step.

Several advantages are offered by the invention. The invention facilitates turning, deceleration, and compression of supersonic airflow and formation of a normal shock resulting in subsonic airflow with a mass flowrate, pressure and other properties critical to properly generating propulsion via combustion or detonation of a fuel within an engine permitting supersonic flight. The invention mitigates conditions, such as inlet unstart and inlet buzz, which adversely affect performance of a turbine engine and/or flight. The invention facilitates a mixed-compression approach to inlet ducts implemented by a design which avoids movable shock ramps, bleed arrangements, and/or other complexities necessitated by supersonic flight. However, the invention is compatible for use with shock ramps and other features of internal compression ducts, external compression ducts, and mixed-compression ducts.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described herein, it is understood that such features may be combinable to form other additional embodiments.

It is understood that mixed-compression as applied to the invention refers to an inlet duct capable of transitioning airflow at a velocity greater than subsonic to a velocity less than supersonic.

Components described herein are manufactured via methods, processes, and techniques understood in the art, including, but not limited to, machining, molding, forming, and three-dimensional printing.

Figure 3:
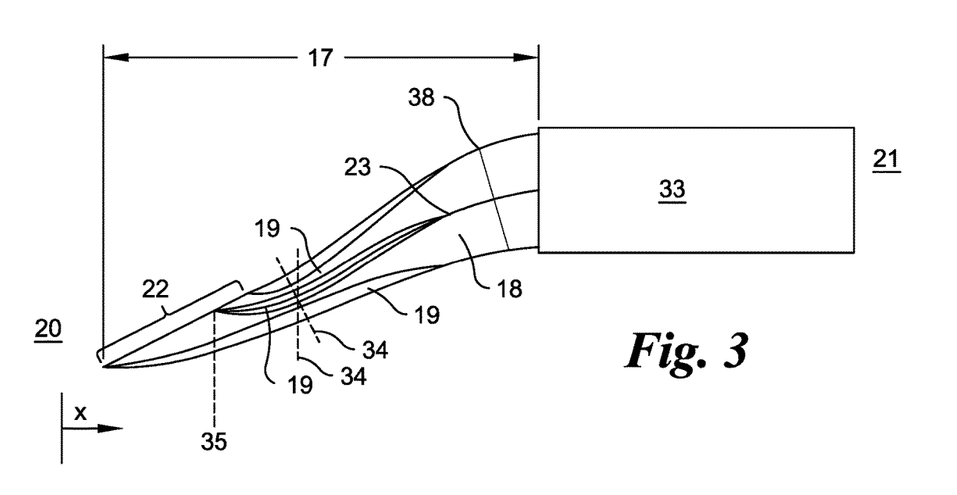
FIG. 3 is a cross-section view illustrating an inlet duct with spikes disposed lengthwise along an interior surface thereof in accordance with an embodiment of the invention.
Figure 4A:
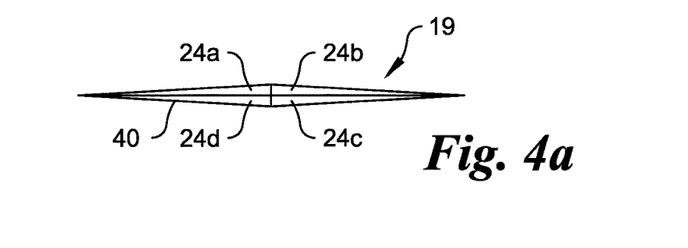
FIG. 4a is a top view illustrating arrangement of surfaces that define a generalized form of a spike in accordance with an embodiment of the invention.
Figures 4B, 4C:
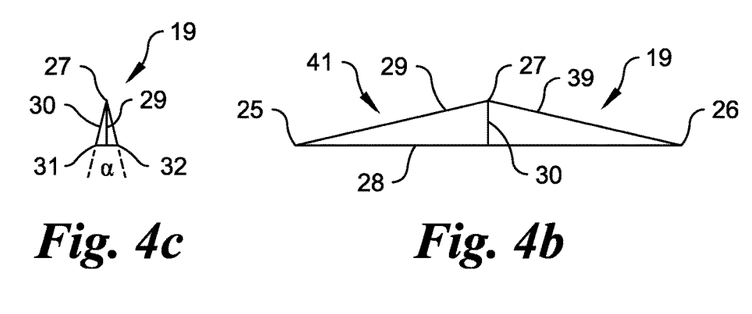
FIG. 4b is a side view illustrating the generalized form of the spike in FIG. 4a wherein the surfaces cooperate to define a longitudinal ridge disposed between an upstream end and a downstream end whereby the longitudinal ridge passes through an apex.
FIG. 4c is an end view illustrating the generalized form of the spike in FIG. 4a wherein the surfaces cooperate to define a lateral ridge disposed between a pair of lateral ends whereby the lateral ridge passes through the apex to define an apex angle.
Figure 4D:
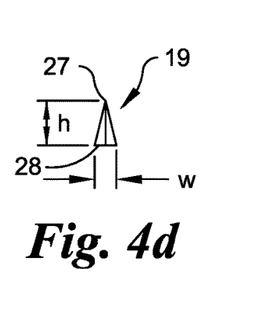
FIG. 4d is a downstream-side, end view illustrating the generalized form of the spike in FIG. 4a wherein the surfaces cooperate to define a height profile so that a maximum height is located at the apex and a width profile so that a maximum width is located between the lateral ends.

Referring now to FIG. 3, the inlet duct 17 is generally defined by a duct structure 38. The duct structure 38 has a tube-like shape with or without bends and further includes an inlet opening and an outlet opening. In FIG. 3, the duct structure 38 is shown with two bends; however, the duct structure 38 may include one or more bends to properly divert airflow into an engine 33. The duct structure 38 may be composed of sheet metal or the like configured to the desired shape. An opening 22 at an upstream side 20 permits airflow to enter the inlet duct 17. Another opening at the downstream side 21 allows airflow to exit the inlet duct 17. The inlet duct 17 is positioned at the input end of an engine 33 so as to provide a continuous pathway for airflow through both the inlet duct 17 and the engine 33. The continuous pathway allows air originating at the upstream side 20 to enter the inlet duct 17 and to exit the engine 33 at a downstream side 21.

Referring again to FIG. 3, one or more spikes 19 are disposed along the interior surface 18 of the duct structure 38. Each spike 19 is an elongated, generally pyramidal-shaped element which conformally overlays a portion of the interior surface 18 of the inlet duct 17. The spike 19 extends along the interior surface 18 at least partially between the opening 22 and the outlet end adjacent to the engine 33. The spike 19 is orientated so as to extend from the interior surface 18 and into the cavity within the duct structure 38. The resultant geometry allows the generally V-shaped cross-section of the spike 19 to protrude into the cavity so as to reduce the flow area through which air is permitted to flow along at least a portion of the airflow path 23. One or more spikes 19 may be oriented parallel to the airflow path 23 or arranged in a generally curved or spiral arrangement with respect to the airflow path 23 so as to achieve the flow area profile required along the length of the duct structure 38.

Referring again to FIG. 3, the spike 19 may be composed of material suitable for use within an inlet duct 17, one non-limiting example being a metal. The spike 19 may be fabricated from one or more methods understood in the art. The form of the spike 19 may be either solid or non-solid, an example of the latter being a spike 19 manufactured from sheet material. In some embodiments, it may be advantageous for the spike 19 to be an integral part of the duct structure 38 rather than an add-on component applied to the duct structure 38.

Referring now to FIGS. 4a-4d, a spike 19 is illustrated in a generalized form 41. The spike 19 is defined by at least four surfaces 24a-24d whereby each surface 24a-24d is generally triangular shaped. The surfaces 24a-24d are arranged to define an elongated, generally pyramidal-shaped structure. The spike 19 is bounded at a lower end by a base 28 and an upper surface by both a longitudinal ridge 29 and a lateral ridge 30. In preferred embodiments, the base 28 is planar. The longitudinal ridge 29 is disposed along a major axis of the spike 19 between an upstream end 25 and a downstream end 26. The length of the spike 19 is the distance between the upstream end 25 and the downstream end 26. The lateral ridge 30 is disposed along a minor axis of the spike 19 between a pair of lateral ends 31, 32. The longitudinal ridge 29 and the lateral ridge 30 intersect at an apex 27. The apex 27 is understood to coincide with the largest cross-sectional area along the spike 19 corresponding to the maximum obstruction to airflow by the spike 19 within the duct structure 38.

Referring again to FIGS. 4a-4d, the distance between longitudinal ridge 29 and the base 28 defines the height (h). The height (h) varies along the major axis of the spike 19 so that it is a minimum at each of the upstream end 25 and the downstream end 26. In preferred embodiments, the height (h) is 0 at the upstream end 25 and/or the downstream end 26. The height (h) is a maximum at the apex 27. The height (h) may vary either linearly or non-linearly between the apex 27 and each of the upstream and downstream ends 25, 26. However, it is understood that the height (h) at other locations along the spike 19 should not exceed the height (h) at the apex 27.

Referring again to FIGS. 4a-4d, the longitudinal ridge 29 and the base 28 cooperate to define a height profile 39. The height profile 39 is bounded by a minimal height (h) at the upstream end 25 and a maximal height (h) at the apex 27 and a minimal height (h) at the downstream end 26. The height profile 39 may be defined by at least three values corresponding to the height (h) at each of the upstream end 25, the downstream end 26, and the apex 27. The height profile 39 between minimals and maximal may be defined by one or more linear and/or non-linear segments described by such non-limiting examples as discreet points or equation(s).

Referring again to FIGS. 4a-4d, the distance between the lateral ends 31, 32 defines the width (w) also understood to be the width across the base 28. The width (w) varies along the base 28 between the upstream end 25 and the downstream end 26. In preferred embodiments, the width (w) is 0 at the upstream end 25 and/or the downstream end 26. The width (w) is a maximum at the apex 27. The width (w) may vary either linearly or non-linearly between the apex 27 and each of the upstream and downstream ends 25, 26. However, it is understood that the width (w) at other locations along the spike 19 should not exceed the width (w) at the apex 27.

Referring again to FIGS. 4a-4d, the intersection between the base 28 and the surfaces 24a-24d cooperate to define a width profile 40 which varies along the major axis or the longitudinal ridge 29. The width profile 40 is bounded by a minimal width (w) at the upstream end 25 and a maximal width (w) at the apex 27 and a minimal width (w) at the downstream end 26. The width profile 40 may be defined by at least three values corresponding to the width (w) along the base 28 at each of the upstream end 25, the downstream end 26, and the apex 27, the latter corresponding to the distance between the lateral ends 31, 32. The width profile 40 between minimals and maximal may be defined by one or more linear and/or non-linear segments described by such non-limiting examples as discreet points or equation(s).

Figure 5:
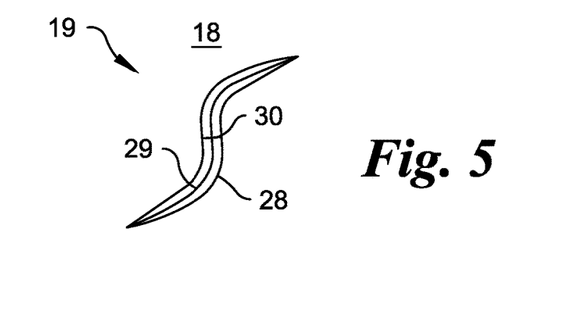
FIG. 5 is a perspective view illustrating a spike along an interior surface of an inlet duct wherein the final shape of the spike as-applied is determined after the generalized form is applied to the interior surface in accordance with an embodiment of the invention.

Referring again to FIGS. 4a-4d, the arrangement of the apex 27 between the lateral ends 31, 32 defines an apex angle ($\alpha$). The apex angle ($\alpha$), the height profile 39, the width profile 40, and distance between upstream and downstream ends 25, 26 define the idealized shape or generalized form 41 of the spike 19 which is then applied onto the interior surface 18 of the duct structure 38. The spike 19 as applied to the interior surface 18 may differ in appearance from the generalized form 41 due to the curvature and other features of the duct structure 38. For example, the generalized form 41 illustrated in FIGS. 4a-4d could result in the spike 19 illustrated in FIG. 5 due to curvature and other variations along the interior surface 18 such that the otherwise linear longitudinal ridge 29 is curved. The height profile 39 and the apex angle ($\alpha$) are maintained when applying the generalized form 41 onto an interior surface 18 even though the visual appearance of the spike 19 as applied differs from the generalized form 41. In preferred embodiments, the height profile 39, the width profile 40, the apex angle ($\alpha$), and distance between upstream and downstream ends 25, 26 are maintained with or without adjustments when applying the generalized form 41 onto the interior surface 18.

Figure 6A:
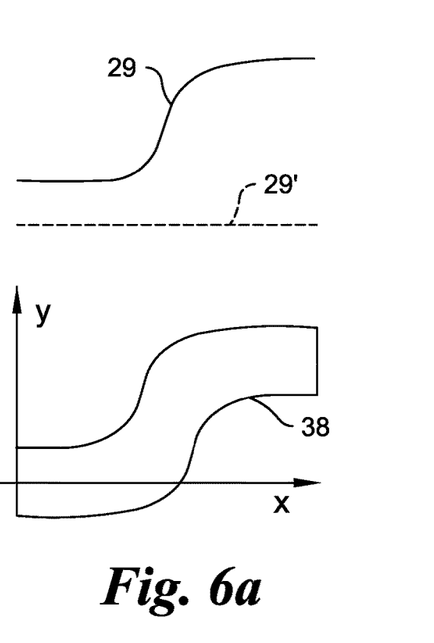
FIG. 6a is a schematic diagram illustrating an exemplary S-shaped duct structure in the plane X-Y wherein the longitudinal ridge (other features of the spike not shown) may be either linear or non-linear.
Figure 6B:
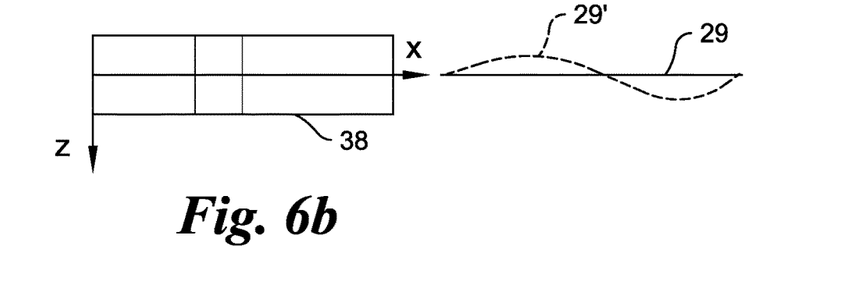
FIG. 6b is a schematic diagram illustrating the exemplary S-shaped duct structure of FIG. 6a in the plane X-Z wherein the longitudinal ridge (other features of the spike not shown) may be either linear or non-linear.
Figure 6C:
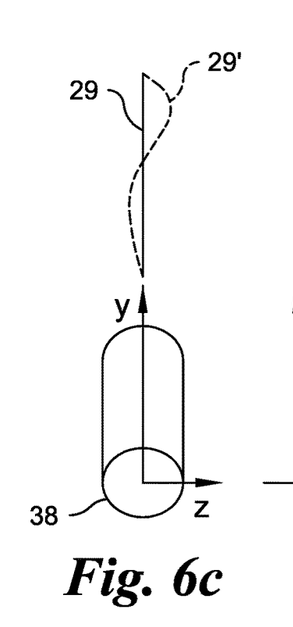
FIG. 6c is a schematic diagram illustrating the exemplary S-shaped duct structure of FIG. 6a in the plane Y-Z wherein the longitudinal ridge (other features of the spike not shown) may be either linear or non-linear.

Referring now to FIGS. 6a-6c, the longitudinal ridge 29 as applied to the interior surface 18 may generally follow a curved path and/or a linear path. The shape of the longitudinal ridge 29 as applied is determined at least in part by the shape of the duct structure 38 and the overlay profile of the spike 19 within the duct structure 38. For example, the longitudinal ridge 29 may follow a curved path in the X-Y plane as illustrated by the solid line in FIG. 6a and a generally linear path in both X-Z and Y-Z planes as illustrated by the solid line in each of FIGS. 6b and 6c, respectively. In another example, the longitudinal ridge 29' may follow a linear path in the X-Y plane as illustrated by the dashed line in FIG. 6a and a generally curved path in both X-Z and Y-Z planes as illustrated by the dashed line in each of FIGS. 6b and 6c, respectively. Other linear and non-linear paths are possible based on the shape of the duct structure 38, features of the interior surface 18, and overlay profile of the generalized form 41 along the interior surface 18.

Figure 7A:
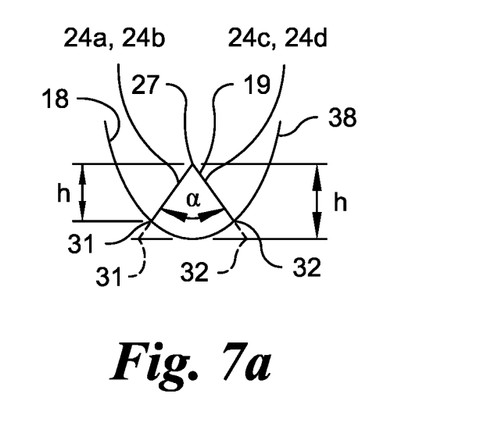
FIG. 7a is a cross-section view illustrating a spike disposed along an interior surface of a duct structure wherein surfaces defining the spike cooperate to form a pointed apex and the surfaces along both spike and duct further cooperate for sealing contact therebetween with or without modification to the spike in accordance with an embodiment of the invention.

Referring now to FIG. 7a and again to FIGS. 4a-4d, the cross section of a spike 19 at the apex 27 is illustrated along the interior surface 18 of a duct structure 38.

In some embodiments, the height profile 39 may be maintained in relation to the intersection between the base 28 and the interior surface 18. At the apex 27, the spike 19 would overlay the duct structure 38 so that the lateral ends 31, 32 contact the interior surface 18. The height (h) is the distance between the apex 27 and the intersection between the lateral ends 31, 32 and the interior surface 18, as illustrated by the left side h in FIG. 7a. At other points along a spike 19, the spike 19 would overlay the duct structure 38 so that the base 28 defined by the lower edges of the surfaces 24a-24d contacts the interior surface 18. The height (h) at other points would be the distance between the longitudinal ridge 29 and the corresponding intersection between the base 28 and the interior surface 18, as illustrated by the left side h in FIG. 7a.

In other embodiments, the height profile 39 may be maintained in relation to the interior surface 18. At the apex 27, the spike 19 would overlay the duct structure 38 so that the lateral ends 31, 32 extend toward the interior surface 18. If the lateral ends 31, 32 would extend past the interior surface 18, then the corresponding surfaces 24a-24d are trimmed or otherwise adjusted so that the effective base 28 properly interfaces with and overlays the interior surface 18. The height (h) is the distance between the apex 27 and the interior surface 18, as illustrated by the right side h in FIG. 7a. At other points along a spike 19, the spike 19 would overlay the interior surface 18 so that the base 28 is position to maintain the height profile 39 as determined between the longitudinal ridge 29 and the interior surface 18. The portions of each surface 24a-24d which would extend past the interior surface 18 are trimmed or otherwise adjusted so that the effective base 28 properly interfaces with and overlays the interior surface 18. The height (h) is the distance between the longitudinal ridge 29 and the interior surface 18, as illustrated by the right side h in FIG. 7a.

Referring again to FIG. 7a, although the right side h is illustrated larger than the left side h in FIG. 7a, this is not indicative of any difference imposed by the overlay approach because the height (h) as applied is the distance between the longitudinal ridge 29 and the base 28 in the generalized form 41. Both approaches may maintain the height profile (h) and the apex angle ($\alpha$) defined by the maximal height (h) and the maximal width (w) at the apex 27, although the width profile 40 may not be maintained in its entirety if adjustments are required to properly interface the intersection between the surfaces 24a-24d and the interior surface 18.

Figure 7B:
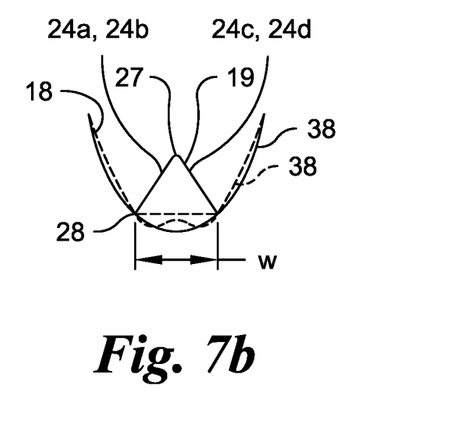
FIG. 7b is a cross-section view illustrating a spike disposed along an interior surface of a duct structure wherein surfaces defining the spike cooperate to form a rounded apex and the surfaces along both spike and duct further cooperate for sealing contact therebetween with or without modification to the duct in accordance with an embodiment of the invention.

Referring now to FIG. 7b, the duct structure 38 may be adjusted to allow for proper overlay of the spike 19 with the interior surface 18. Adjustments to the duct structure 38 might include moving a localized portion of the duct structure 38 either outward or inward so that the interior surface 18 contacts one or more portions of the base 28 defined by the lower edges of the surfaces 24a-24d. Adjustments to the duct structure 38 may be instead of or in addition to adjustments to the surfaces 24a-24d otherwise described herein.

Figure 8A:
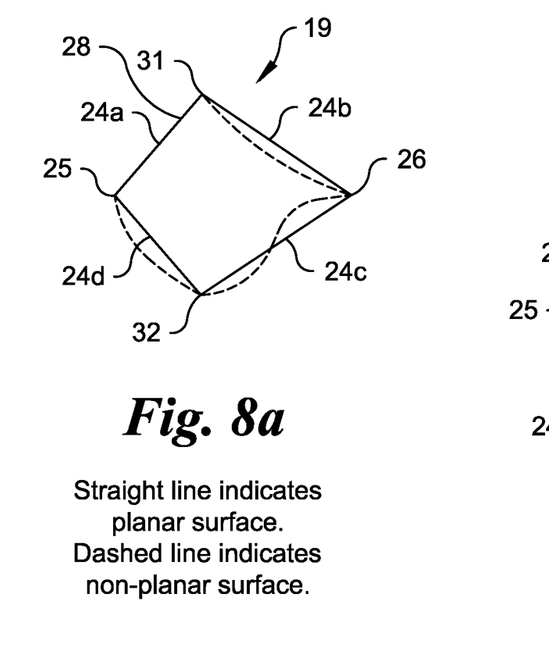
FIG. 8a is a cross-section view illustrating arrangement of surfaces to form a structure longitudinally bounded by an upstream end and a downstream end and laterally bounded by a pair of lateral ends wherein upstream, downstream, and lateral ends and corresponding ridges are pointed and further wherein one or more surfaces may include non-linear features in accordance with other embodiments of the invention.

Referring now to FIG. 8a, the surfaces 24a-24d correspond to the structure comprising the spike 19 and therefore define the exterior surface thereof. In preferred embodiments, one or more surfaces 24a-24d may be either planar as illustrated by the solid lines or non-planar as illustrated by the dashed lines. While one or more surfaces may be non-planar, it is understood that the spike 19 should maintain and present a generally pyramidal shape which is elongated along the major axis. Non-planar features of a surface 24a-24d may extend to the lower edge of the surface 24a-24d so that at least a portion of the base 28 is defined by a non-linear segment. Non-linear features of the one or more surfaces 24a-24d and corresponding non-linearity along the base 28 between the upstream end 25 and the lateral end 31 and/or the lateral end 31 and the downstream end 26 and/or the downstream end 26 and the lateral end 32 and/or the lateral end 32 and the upstream end 25 may facilitate overlay of a spike 19 along the interior surface 18 and/or improve the performance of the spike 19. It may also be advantageous in some embodiments for the surfaces 24a-24d to form an apex 27 which is rounded as illustrated in FIG. 7b rather than a pointed apex 27 illustrated in FIG. 7a.

Figure 8B:
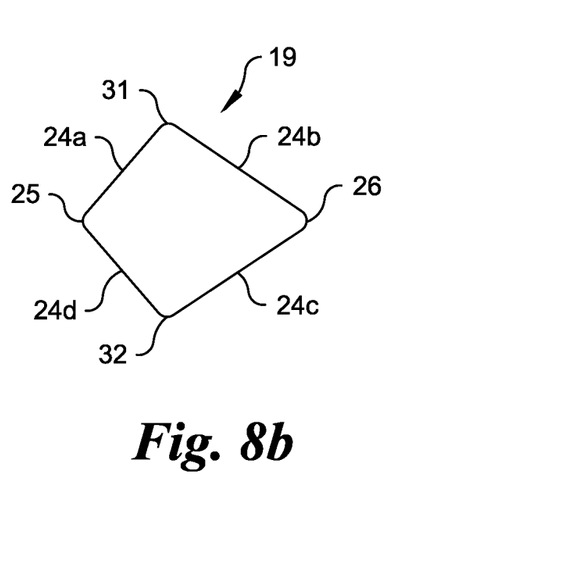
FIG. 8b is a cross-section view illustrating arrangement of surfaces to form a structure longitudinally bounded by an upstream end and a downstream end and laterally bounded by a pair of lateral ends wherein upstream, downstream, and lateral ends and corresponding ridges are rounded in accordance with an embodiment of the invention.

Referring now to FIG. 8b, corresponding surfaces 24a-24d may intersect so that corner features corresponding to the upstream and downstream ends 25, 26 and/or the lateral ends 31, 32 are likewise rounded rather than pointed. In preferred embodiments, the longitudinal ridge 29 is also rounded when the upstream and downstream ends 25, 26 are round. In other preferred embodiments, the lateral ridge 30 is also rounded when the lateral ends 31, 32 are round. The pointed or rounded feature at the intersection between two surfaces 24a-24d may improve performance of the spike(s) 19 within a duct structure 38.

Figure 9A:
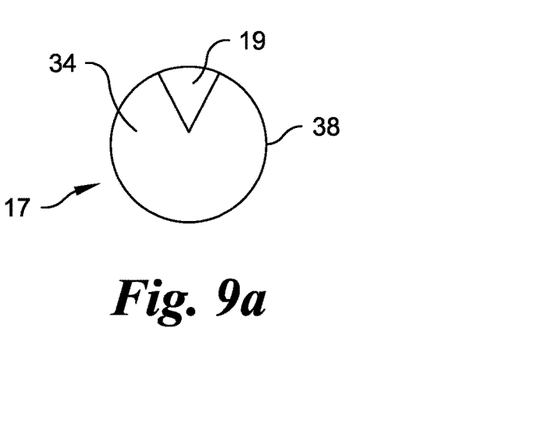
FIG. 9a-9e are cross-section views illustrating an inlet throat formed by and between 1, 2, 3, 10, and 24 spikes, respectively, wherein the spikes are arranged so that the maximum height(s) and the maximum width(s) are disposed along a common plane intersecting a duct structure so as to maximally compress and decelerate airflow at a specific location along an inlet duct in order to optimize airflow downstream of the inlet throat in accordance with an embodiment of the invention.
Figure 9B:
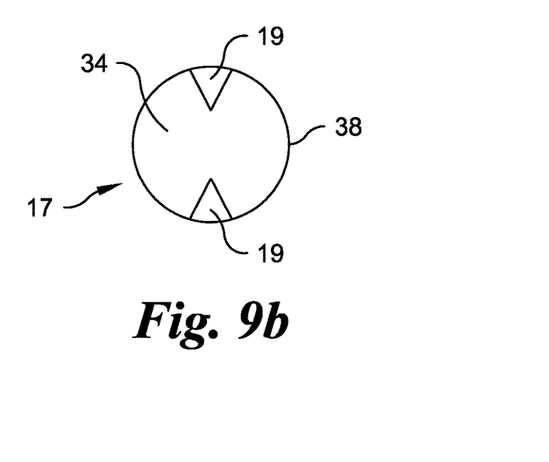
Figure 9C:
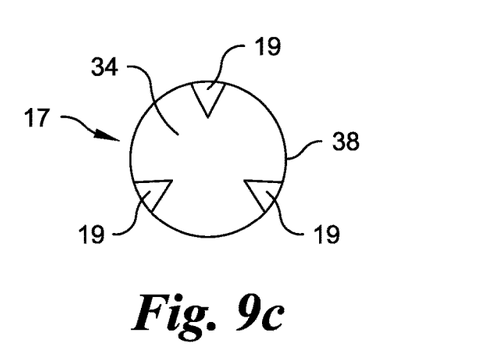
Figure 9D:
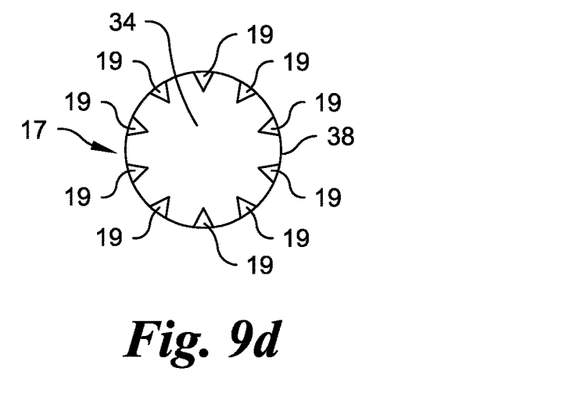
Figure 9E:
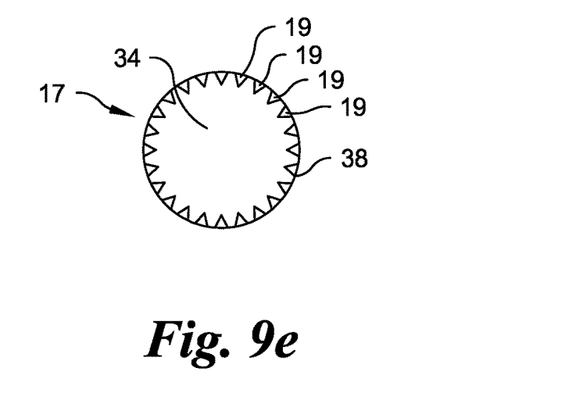

Referring now to FIGS. 9a-9e, each spike 19 extends into the cavity formed by the duct structure 38 thereby obstructing a portion of the cavity so as to narrow the pathway through which air is permitted to flow. The obstructive properties of the spike 19 are determined at least by the height profile 39 and the width profile 40. The dimensional variations of both the height and width profiles 39, 40 along the generally V-shaped cross section of the spike 19 cooperate with the duct structure 38 to first reduce and then to enlarge the free flow area within the duct structure 38. The maximum obstruction is achieved by the apex 27 at the inlet throat 34. In some embodiments, it may be possible to decelerate airflow via one spike 19 as illustrated in FIG. 9a. In other embodiments, two or more spikes 19 may be required as illustrated by way of example only in FIGS. 9b-9e. In general, the cross-sectional dimensions, namely, height (h) and width (w), of each spike 19 are inversely related to the number of spikes 19 provided along the interior surface 18.

Referring again to FIG. 3, the apexes 27 of two or more spikes 19 are generally aligned along a common plane so that a single inlet throat 34 is formed. The inlet throat 34 may vertically or perpendicularly intersect the airflow path 23 as illustrated in FIG. 3. The result is a maximal narrowing of the cross section or free flow area through which air is permitted to flow across a portion of the inlet duct 17.

Figure 10A:
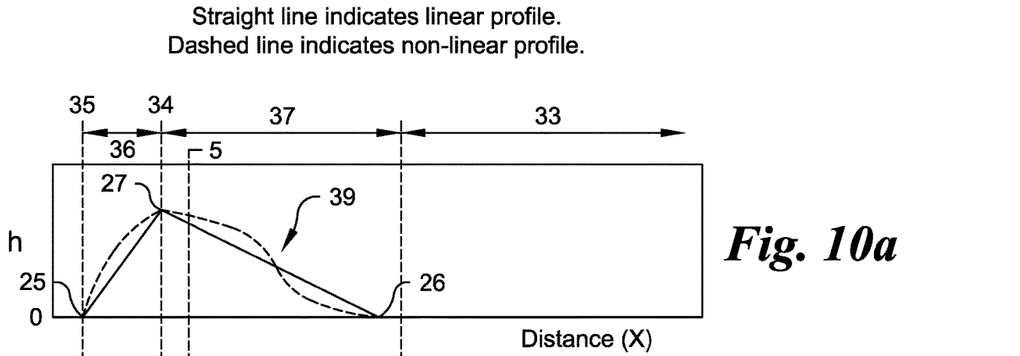
FIG. 10a is a plot of height versus distance for an exemplary spike illustrating a height profile wherein the height is 0 at each of the upstream end and the downstream end and the height is at a maximum at the apex whereby the cross section corresponding to the apex of one or more spikes cooperate to define an inlet throat in accordance with an embodiment of the invention.

Referring now to FIG. 10a, each spike 19 includes a height profile 39 which increases and decreases about the apex 27. The height profile 39 within the first diffuser section 36 of the spike 19 is characterized by a linearly (solid line) or non-linearly (dashed line) increasing height (h) from the upstream end 25 to the apex 27. The height profile 39 within the second diffused section 37 of the spike 19 is characterized by a linearly (solid line) or non-linearly (dashed line) decreasing height (h) from the apex 27 to the downstream end 26. The maximal height (h) is situated at the apex 27. In some embodiments, the height profile 39 may include both linear and non-linear features. The length of each of the first and second diffuser sections 36, 37 may be the same or differ. Further, the spike 19 may be symmetric or non-symmetric about the longitudinal ridge 29, the lateral ridge 30, and/or the apex 27.

Figure 10B:
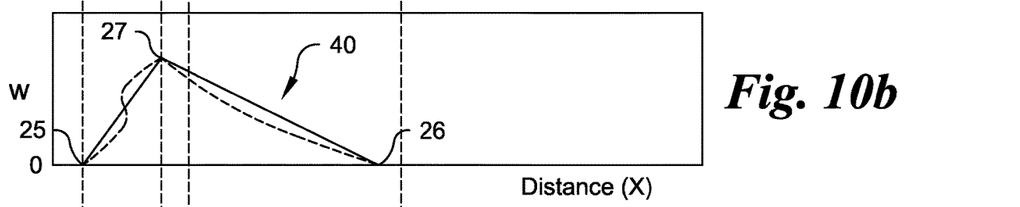
FIG. 10b is a width versus distance plot for an exemplary spike illustrating a width profile wherein the width is 0 at each of the upstream end and the downstream end and the width is at a maximum at the apex whereby the cross section corresponding to the apex of one or more spikes cooperate to define an inlet throat in accordance with an embodiment of the invention.

Referring now to FIG. 10b, each spike 19 includes a width profile 40 which increases and decreases about the apex 27. The width profile 40 within the first diffuser section 36 of the spike 19 is characterized by a linearly (solid line) or non-linearly (dashed line) increasing width (w) from the upstream end 25 to the apex 27. The width profile 40 within the second diffused section 37 of the spike 19 is characterized by a linearly (solid line) or non-linearly (dashed line) decreasing width (w) from the apex 27 to the downstream end 26. The maximal width (w) is situated at the apex 27. In some embodiments, the width profile 40 may include both linear and non-linear features.

Referring again to FIGS. 10a and 10b, the maximal height (h) and the maximal width (w) maximize the obstructive properties of the spike 19 at the apex 27 so that the free flow area is minimized with respect to location along the spike 19. The end result is the inlet throat 34 which corresponds to the minimum cross-sectional area through which air is permitted to flow through the inlet duct 17. The free flow area before, at, and after the inlet throat 34 is tailored based on flow conditions into and flow conditions required out of the inlet duct 17. The inlet throat 34 is tailorable via such parameters as the height profile 39, the width profile 40, the maximal values of the height (h) and the width (w) at the apex 27, the minimal values of the height (h) and the width (w) at the upstream end 25 and the downstream end 26, the location of the apex 27 along the spike 19, the location of the upstream end 25 with respect to the inlet start 35, the location of the downstream end 26 with respect to the engine 33, the number and arrangement of spikes 19, the location and orientation of the inlet throat 34, and the preferred location after the inlet throat 34 at which the normal shock 5 is formed by the spikes 19.

Figure 11:
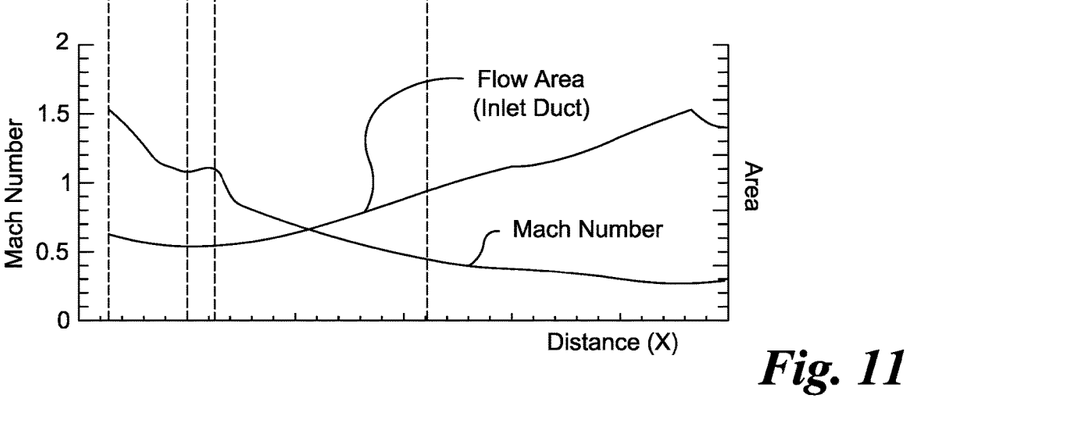
FIG. 11 is a plot of Mach Number and cross-sectional area versus distance along the inlet duct illustrating deceleration of airflow across a first diffuser section, an inlet throat, and a second diffuser section formed by one or more spikes along the interior surface of an inlet duct in accordance with an embodiment of the invention.

Referring now to FIG. 11, the free flow area through the duct structure 38 gradually decreases between the inlet start 35 and the inlet throat 34. The decrease corresponds with an increasing height profile 39 and/or width profile 40 along the portion of each spike 19 that define the first diffuser section 36. The free flow area reaches a minimum which corresponds with the apex(es) 27 at the inlet throat 34. The free flow area at the inlet throat 34 may be decreased by increasing the height (h) and/or width (w) of one or more apexes 27. The free flow area increases between the inlet throat 34 and the engine 33. The increase corresponds with a decreasing height profile 39 and/or width profile 40 along the portion of each spike 19 that define the second diffuser section 37.

Referring again to FIG. 11, the first diffuser section 36 and the inlet throat 34 isentropically compress and decelerate the airflow after entering the inlet duct 17 greater than subsonic so that the airflow is subsonic downstream from the inlet throat 34. The portion of the spike(s) 19 that defines the first diffuser section 36 narrows the free flow area so that the airflow is decelerated from supersonic at the inlet start 35 to slightly supersonic at the inlet throat 34. After the inlet throat 34, the portion of the spike(s) 19 that defines the second diffuser section 37 broadens the free flow area so that the airflow is properly conditioned to form a normal shock 5. The normal shock 5 is formed adjacent and downstream to the inlet throat 34 and the airflow is slightly more supersonic than immediately after the inlet throat 34. Thereafter, the combination of the normal shock 5 and the widening free flow area causes the flow velocity to decrease to subsonic prior to entering the engine 33.

Referring again to FIGS. 10a, 10b and 11, the airflow enters the inlet duct 17 greater than subsonic and then passes over at least one spike 19 disposed along the interior surface 18. The spike 19 is oriented so that the upstream end 25 is biased toward the upstream side 20 and the downstream end 26 is biased toward the downstream side 21. This arrangement allows the spike 19 to be linearly and/or non-linearly disposed along the interior surface 18 based on the overlay profile between spike 19 and interior surface 18. The spike 19 is constructed to include least four surfaces 24a-24d which cooperate to form the longitudinal ridge 29 which passes through the apex 27 between the upstream end 25 and the downstream end 26 and to also form the lateral ridge 30 which passes through the apex 27 between the pair of lateral ends 31, 32. The longitudinal ridge 29 may be non-linear at least in part so that the spike 19 is curved at least partially along the interior surface 18. One or more surfaces 24a-24d may be non-planar. The upstream and downstream ends 25, 26 and the lateral ends 31, 32 are separately disposed at the corners of the base 28. The height (h) at locations along the spike 19 are defined by the distance between the longitudinal ridge 29 and the interior surface 18 whereby the height (h) is maximal at the apex 27. The width (w) is perpendicular to the height (h) and corresponds to distance across the base 28 at the location of the height (h) whereby the width (w) is maximal at the apex 27. The airflow is compressed as it passes along the first diffuser section 36 of each the spike 19 upstream of the inlet throat 34. The height (h) or the width (w) increases along the first diffuser section 36 in the direction of the inlet throat 34. The inlet throat 34 is formed at the location of one or more apexes 27. The compression decelerates airflow more rapidly when either the height (h) or the width (w) is increased. The airflow may exit the inlet throat 34 with a Mach Number from 1.0 to 1.1. The normal shock 5 is formed after compression of the airflow and downstream from the inlet throat 34. It is understood that the normal shock 5 assists with deceleration of the airflow. The airflow is then expanded along the second diffuser section 37 of each spike 19 downstream of the inlet throat 34. It is believed that the expansion assists with the deceleration process. The height (h) or the width (w) decreases along the second diffuser section 37 in the direction away from the inlet throat 34. Thereafter, the airflow is communicated into the engine 33 at the downstream side 21 of the inlet duct 17.

Referring again to FIGS. 3, 4a-4d, 5, 6a-6c, 7a, 7b, 8a, and 8b, the inlet duct 17 is constructed by defining the generalized form 41 of the spike 19 and overlaying the generalized form 41 within the inlet duct 17 resulting in the final form of the spike 19 as applied within the duct structure 38. The generalized form 41 is defined so as to be bounded by the longitudinal ridge 29 and the lateral ridge 30 which intersect at the apex 27. The longitudinal ridge 39 intersects the base 28 at the upstream end 25 and the downstream end 26 to further define the height profile 39 therebetween wherein the height (h) between the longitudinal ridge 29 and the base 28 increases in the direction of the apex 27. The lateral ridge 30 intersects the base 28 at a pair of lateral ends 31, 32 to define a width (w) therebetween wherein the width (w) decreases away from the apex 27 along the longitudinal ridge 29 or the major axis to further define the width profile 40. The height (h) may be 0 and the width (w) may be 0 at each of the upstream end 25 and the downstream end 26. The height (h) and the width (w) are maximal at the apex (27). The apex angle (α) is defined by the lateral ridge 30 passing between the opposed lateral ends 31, 32 and through the apex 27. The generalized form 41 is mapped onto the interior surface 18 of the inlet duct 17 so that the height profile 39 and the apex angle (α) are maintained. Thereafter, the base 28 or the interior surface 18 are adjusted so that the spike 19 sealingly contacts the interior surface 18. In preferred embodiments, the sealing contact should prevent airflow between the spike 19 and the interior surface 18. After mapping, the spike 19 may differ shape-wise from the generalized form 41 because of features of the interior surface 18. Mapping may maintain the linearity of the longitudinal ridge 29 in at least one plane or cause the spike 19 to be curved in part or whole. The base 28 may be formed by at least four surfaces 24a-24d and at least one surface 24a-24d shortened or lengthened so as to contact the interior surface 18 or the interior surface 18 moved so as to contact at least one surface 24a-24d.

In some applications, the initial generalized form 41 could be reconstructed from a known spike 19 disposed along the interior surface 18 of a known design whereby the known spike 19 is modified to define the generalized form 41 and then altered prior to mapping. By way of example, reconstruction may include the visualization of a spike 19 in its idealized form as represented in FIGS. 4a-4d based on height profile 39, width profile 40, apex angle (α), and length of a spike 19 disposed along an inlet duct 17 as represented in FIG. 3.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

As is evident from the explanation herein, the invention is a flow conditioning device which facilitates transition of airflow from a greater-than-subsonic condition to a subsonic condition. The invention is applicable for use with a variety of engines which require less-than-supersonic airflow for proper operation, however which rely on a source wherein the air is obtained from a freestream flow at a velocity that is greater than subsonic.

What is claimed is:

1. A method for supersonic flight via a turbine engine with a mixed-compression inlet duct comprising the steps of:
   (a) passing an airflow over at least two spikes disposed along an interior surface of a duct structure of said mixed-compression inlet duct, each said spike sealingly contacts said interior surface, each said spike includes a longitudinal ridge and a lateral ridge which intersect at an apex, said longitudinal ridge intersects a base at an upstream end and a downstream end to define a height wherein said height between said longitudinal ridge and said base increases along said longitudinal ridge in direction toward said apex, said lateral ridge intersects said base at a pair of lateral ends to define a width wherein said width decreases along said longitudinal ridge with distance from said apex, said mixed-compression inlet duct having an opening at an upstream side to permit said airflow to enter said mixed-compression inlet duct, said upstream end of said longitudinal ridge located at or downstream from said opening;
   (b) compressing said airflow along a first diffuser section of said spikes upstream of an inlet throat, said inlet throat formed at said apexes;
   (c) forming a normal shock after said compressing step and downstream from said inlet throat, said airflow more supersonic at said normal shock than at said inlet throat; and
   (d) expanding said airflow along a second diffuser section of said spikes downstream of said inlet throat, said normal shock decelerates said airflow which enters said opening to less than supersonic and at a pressure permitting said supersonic flight.

2. The method of claim 1, further comprising the step of:
   (e) communicating said airflow into said turbine engine after said expanding step.

3. The method of claim 1, said compressing step decelerates said airflow more rapidly when either said height or said width increased along said first diffuser section.

4. The method of claim 1, wherein said supersonic flight being enabled by combustion of a fuel within said turbine engine.

5. The method of claim 1, wherein said supersonic flight being enabled by detonation of a fuel within said turbine engine.

6. The method of claim 1, wherein said longitudinal ridge being linear in at least one plane.

7. The method of claim 1, wherein at least one said spike being curved.

8. The method of claim 1, wherein said height and said width being maximal at said apex.

9. The method of claim 1, wherein said height being 0 and said width being 0 at each of said upstream end and said downstream end.

10. The method of claim 1, wherein said base being bounded by four surfaces.

11. The method of claim 1, wherein said airflow exits said inlet throat at a Mach number from 1.0 to 1.1.

12. The method of claim 1, wherein at least one said spike includes at least four surfaces which cooperate to define said longitudinal ridge and said lateral ridge.

13. The method of claim 12, wherein at least one said surface being planar.

14. The method of claim 12, wherein at least one said surface being non-planar.

15. The method of claim 12, wherein said longitudinal ridge being non-linear at least in part.

16. The method of claim 1, wherein said normal shock having a Mach number of 1.1.

17. The method of claim 1, wherein said inlet throat being decreased by increasing at least one of said height or said width of said apexes.

18. The method of claim 1, wherein said airflow being supersonic after passing through said inlet throat and then subsonic when entering said turbine engine.

19. A method for designing an inlet duct for use at an input end of a turbine engine facilitating supersonic flight comprising the steps of:
(a) defining a spike including a longitudinal ridge and a lateral ridge which intersect at an apex, said longitudinal ridge intersects a base at an upstream end and a downstream end to define a height wherein said height between said longitudinal ridge and said base increases along said longitudinal ridge in direction toward said apex, said lateral ridge intersects said base at a pair of lateral ends to define a width wherein said width decreases along said longitudinal ridge with distance from said apex, said inlet duct having an opening at an upstream side to permit an airflow to enter said inlet duct, said longitudinal ridge at said upstream end located at or downstream of said opening;
(b) mapping said spike onto an interior surface of said inlet duct; and
(c) adjusting at least one of said base or said interior surface so that said spike sealingly contacts said interior surface;
wherein said apex of one or more said spikes define an inlet throat after said adjusting step so that a normal shock is formed downstream from said inlet throat, said airflow more supersonic at said normal shock than at said inlet throat, said normal shock decelerates said airflow which enters said opening to less than supersonic and at a pressure permitting said supersonic flight.

20. A method for designing an inlet duct for use at an input end of a turbine engine facilitating supersonic flight comprising the steps of:
(a) mapping a spike onto an interior surface of said inlet duct, said spike includes a longitudinal ridge and a lateral ridge which intersect at an apex, said longitudinal ridge intersects a base at an upstream end and a downstream and, said lateral ridge intersects said base at a pair of lateral ends, said inlet duct having an opening at an upstream side to permit an airflow to enter said inlet duct, said longitudinal ridge at said upstream end located at or downstream of said opening; and
(b) adjusting at least one of said base or said interior surface so that said spike sealingly contacts said interior surface;
wherein said apex of one or more said spikes define an inlet throat after said adjusting step so that a normal shock is formed downstream from said inlet throat, said airflow more supersonic at said normal shock than at said inlet throat, said normal shock decelerates said airflow which enters said opening to less than supersonic and at a pressure permitting said supersonic flight.

* * * * *